United States Patent [19]

Blessinger et al.

[11] Patent Number: 6,098,773
[45] Date of Patent: Aug. 8, 2000

[54] FRICTION CLUTCH HAVING PROTECTIVE INTERNAL SHIELD

[75] Inventors: Jeffrey S. Blessinger; Daniel V. Gochenour; John David Conrad, all of Auburn, Ind.

[73] Assignee: Eaton Corporation, Cleveland, Ohio

[21] Appl. No.: 09/201,409

[22] Filed: Nov. 30, 1998

[51] Int. Cl.[7] .................................................. F16D 13/75
[52] U.S. Cl. .................................. 192/70.25; 192/111 A; 192/112
[58] Field of Search ........................ 192/70.25, 111 A, 192/112

[56] References Cited

U.S. PATENT DOCUMENTS

| | | |
|---|---|---|
| 1,490,967 | 4/1924 | Denneen et al. . |
| 2,241,223 | 5/1941 | Spase et al. . |
| 4,941,557 | 7/1990 | Flotow et al. . |
| 5,080,212 | 1/1992 | Flotow et al. ....................... 192/70.25 |
| 5,409,091 | 4/1995 | Reik et al. ............................ 192/70.25 |
| 5,450,934 | 9/1995 | Maucher ............................... 192/70.25 |
| 5,645,152 | 7/1997 | Weidinger ............................ 192/70.25 |
| 5,836,433 | 11/1998 | Uehara ................................. 192/70.25 |

*Primary Examiner*—Charles A Marmor
*Assistant Examiner*—Saúl Rodríguez
*Attorney, Agent, or Firm*—Dykema Gossett PLLC

[57] ABSTRACT

A frictional clutch for a motor vehicle includes a cover, a pressure plate, a biasing member, an adjustment mechanism and an annular shield. The cover has an axis of rotation. The pressure plate is coupled to the cover for rotation therewith about the axis. The pressure plate has a frictional engagement surface substantially normal to the axis. The biasing member is interposed between the cover the pressure plate, and biases the pressure plate toward an engaged pressure plate position. The adjustment mechanism is centered about the axis and is located at a first radial distance from the axis. The adjustment mechanism is operably disposed between the biasing member and one of the pressure plate and the cover. The annular shield is disposed radially within the adjustment mechanism. The annular shield is axially alignment with the adjustment mechanism. The shield is sized and oriented to protect the adjustment mechanism from debris radiating outward from a central area of the clutch.

15 Claims, 5 Drawing Sheets

FRICTION CLUTCH HAVING PROTECTIVE INTERNAL SHIELD

FIELD OF THE INVENTION

This invention relates to the field of friction clutches and more particularly to friction clutches having adjustment mechanisms.

BACKGROUND OF THE INVENTION

Known friction clutches provide a releasable torsional connection between a motor vehicle engine flywheel and an associated transmission. Repeated clutch disengagement and engagement cycles wear the friction material of the clutch driven disc. The wear results in a change in the axial location of the pressure plate in the engagement position. The shift in axial location results in a decrease in the clutch engagement force or clamping load. Clutches are commonly provided with adjustment mechanisms to compensate for such wear.

Clutches achieve the required clamping loads by applying a spring load to the pressure plate. One type of clutch applies a spring load to a plurality of radially oriented levers which in turn engage the pressure plate. If compressive coil or angle springs are employed, the spring load is commonly applied to radially inner ends of the levers. The levers are pivotally supported at the radially outer ends. As the friction material wears, the engaged position of the radially inner lever tips moves closer to the flywheel. Adjustment mechanisms disposed between the cover and the levers compensate for this change by increasing the axial distance of the levers' pivot points from the cover. Alternatively, the change in friction material thickness is compensated for by providing an adjustment mechanism on the pressure plate instead of the cover. Clutches may employ diaphragm springs in place of coil springs. Some types of diaphragm springs may have radially inwardly directed fingers in place of multiple piece lever and spring arrangements. The fingers act as the levers of the heavy duty clutches in that they are axially displaced at their radially inner most tip to release the clutch.

Known adjustment mechanisms typically rely on the relative rotation of two parts having inclined surfaces in common engagement with each other. The relative rotation of these elements compensates for wear of the friction material. One strategy for compensating is to axially displace the pivot ends of the levers away from the cover and closer to the flywheel, thereby reducing the amount of spring deflection required to achieve a full clutch engagement. Another strategy is to axially displace the pressure plate's point of contact with the levers away from an engagement surface of the pressure plate, thereby compensating for friction material wear. The ease of adjustment is greatly affected by the coefficient of friction between the relatively rotating parts. When the engaged surfaces become contaminated by debris from the clutch, it increases the difficulty of properly adjusting the clutch to compensate for any wear of the friction elements. The configuration of the clutch allows, and indeed promotes the circulation of debris through the clutch. Spinning the clutch cenfrigually forces or impels air and airborne debris through large openings in the clutch cover. Debris may include facing dust, cast iron dust, fretting material and external road dirt, moisture and/or salt.

It is desired to provide a clutch with an adjusting mechanism which is relatively insensitive to the debris commonly found in clutches.

It is also desired to provide a clutch with a shield protecting the adjustment mechanism from the entry of debris there into.

SUMMARY OF THE INVENTION

A frictional clutch for a motor vehicle includes a cover, a pressure plate, a biasing member, an adjustment mechanism and an annular shield. The cover has an axis of rotation. The pressure plate is coupled to the cover for rotation therewith about the axis. The pressure plate has a frictional engagement surface substantially normal to the axis. The biasing member is interposed between the cover the pressure plate, and biases the pressure plate toward an engaged pressure plate position. The adjustment mechanism is centered about the axis and is located at a first radial distance from the axis. The adjustment mechanism is operably disposed between the biasing member and one of the pressure plate and the cover. The annular shield is disposed radially within the adjustment mechanism. The annular shield is axially alignment with the adjustment mechanism. The shield is sized and oriented to protect the adjustment mechanism from debris radiating outward from a central area of the clutch.

A frictional clutch for a motor vehicle includes a cover, a pressure plate, an adjusting ring, an adjustment mechanism, a plurality of levers, a retainer, a plurality of springs and a substantially annular shield. The cover has an axis of rotation. The pressure plate is coupled to the cover for rotation therewith about the axis. The pressure plate has a frictional engagement surface substantially normal to the axis. The adjusting ring is adjustably mounted to the cover and defines a plurality of pivot points. The adjusting ring is centered about the axis. The adjustment mechanism is axially disposed between the adjusting ring and the cover. The adjustment mechanism has inclined surfaces engaging each other. Relative rotation between the first and second inclined surfaces axially displaces the adjusting ring pivot points away from the cover. The adjustment mechanism is located at a first radial distance from the axis. The levers are radially oriented about the axis. The levers engage the adjusting ring proximate to a radially outer end of the levers and engage the pressure point radially inwardly of the radially outer end. The retainer is engaged by the radially inner tips of the levers and is selectively axially moveable between engaged and disengaged positions. The springs are disposed between the cover and the retainer. The springs bias the levers toward the pressure plate and the springs act on the levers to bias the pressure plate to an engaged pressure plate position. The shield is disposed radially within the adjustment mechanism, and is in axial alignment therewith. The shield protects the adjustment mechanism by blocking debris radiating outward from a central area of the clutch.

The inventive clutch provides an adjusting mechanism which is relatively insensitive to the debris commonly found in clutches.

The inventive clutch includes a shield protecting the adjustment mechanism from the entry of debris there into.

DESCRIPTION OF PREFERRED EMBODIMENTS

Figure 1:
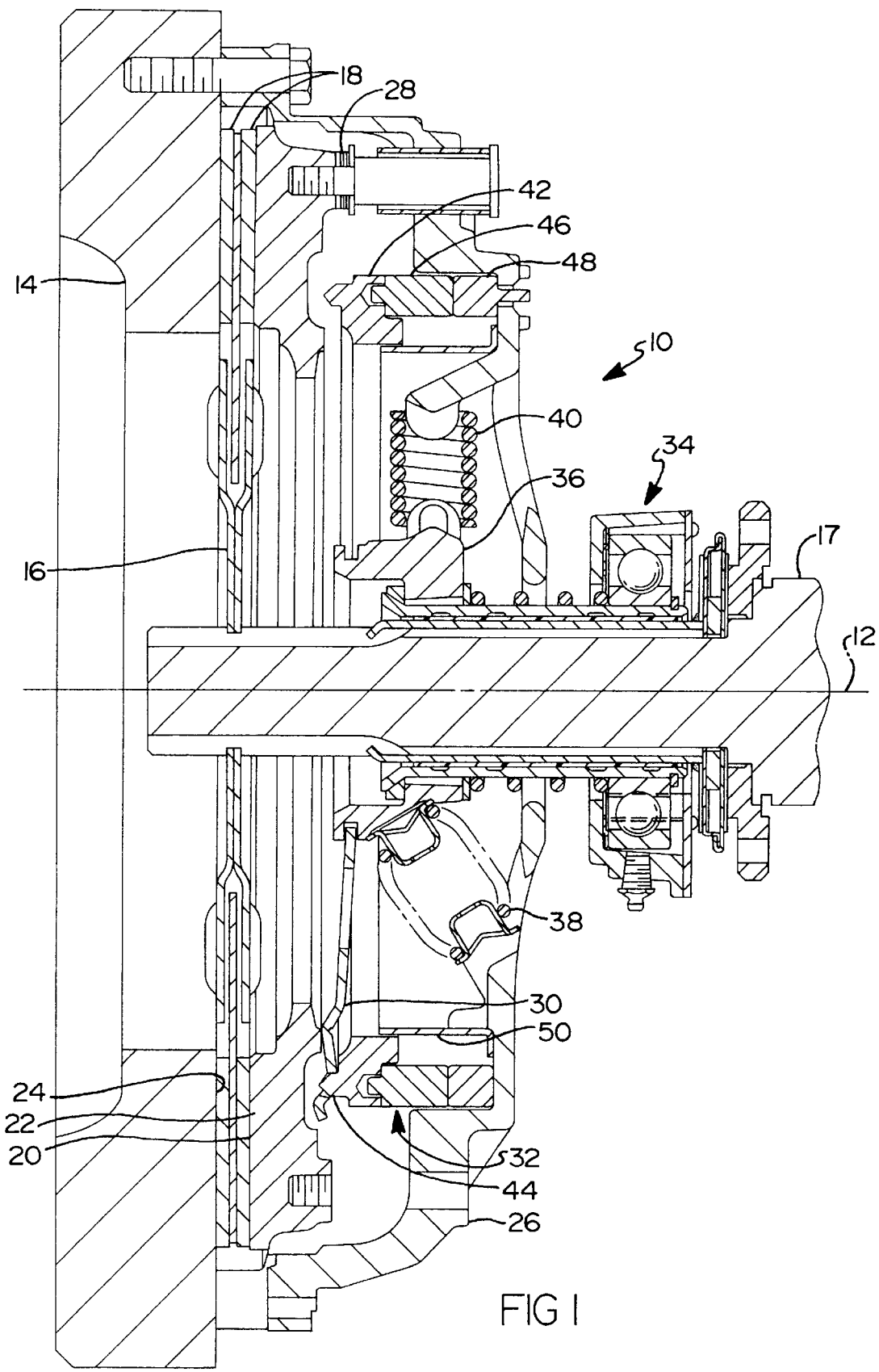
FIG. 1 is a sectional side view of a first embodiment of the invention.

A frictional clutch 10 for a motor vehicle is shown in FIG. 1. Clutch 10 rotates about an axis 12. A flywheel 14 is rotatably fixed to a crankshaft of a motor vehicle engine (not shown). A driven disc 16, centered with respect to axis 12, has a hub which engages an input shaft 17. A friction element 18 of driven disc 16 is engaged by an engagement surface 20 of pressure plate 22 on one side and by an engagement surface 24 of flywheel 14 on the other side.

A cast cover 26 is disposed over pressure plate 22 and is fixed to flywheel 14. A plurality of straps 28 circumferentially extend between pressure plate 22 and cover 26. Straps 28 rotatably fix pressure plate 22 to cover 26, while allowing relative axial displacement of pressure plate 22 to cover 26. Six levers 30 extend radially outwardly from a release assembly 34 to an adjustment mechanism 32. Levers 30 engage pressure plate 22 at a point between their engagement with adjustment mechanism 32 and release assembly 34. The radially innermost tips of levers 30 engage release sleeve retainer 36. As release assembly 34 is axially displaced along axis 12, levers 30 pivot about their radially outer ends to enable engagement and disengagement of clutch 10. Clutch apply springs 38 are disposed between release sleeve retainer 36 and cover 26, as are assist springs 40. Apply springs 38 bias retainer 36 toward flywheel 14. The force of springs 38 is transferred through levers 30 to pressure plate 22, thereby clamping driven disc 16 against engagement surface 24 of flywheel 14.

Figure 2:
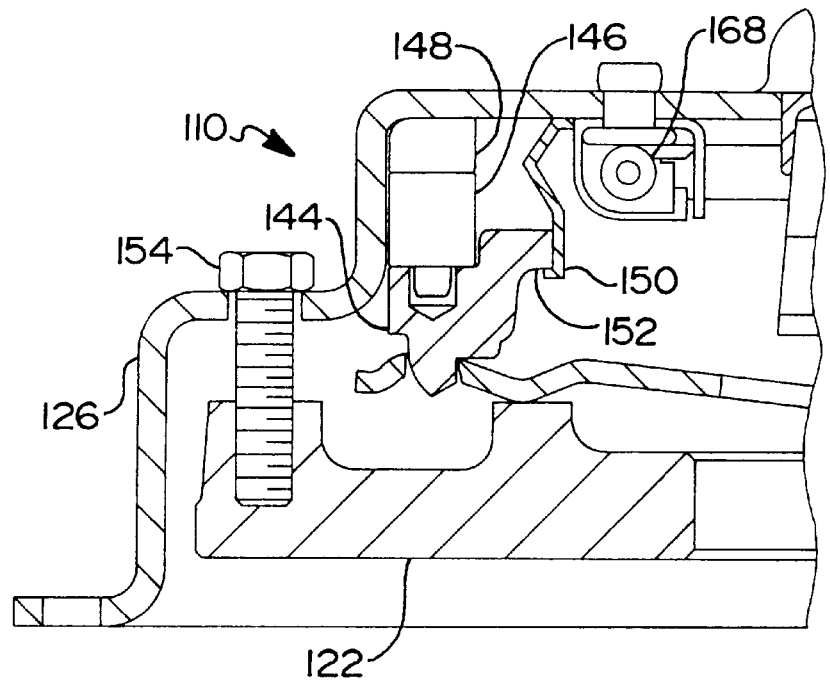
FIG. 2 is a partial sectional side view of a second embodiment of the invention.
Figure 3:
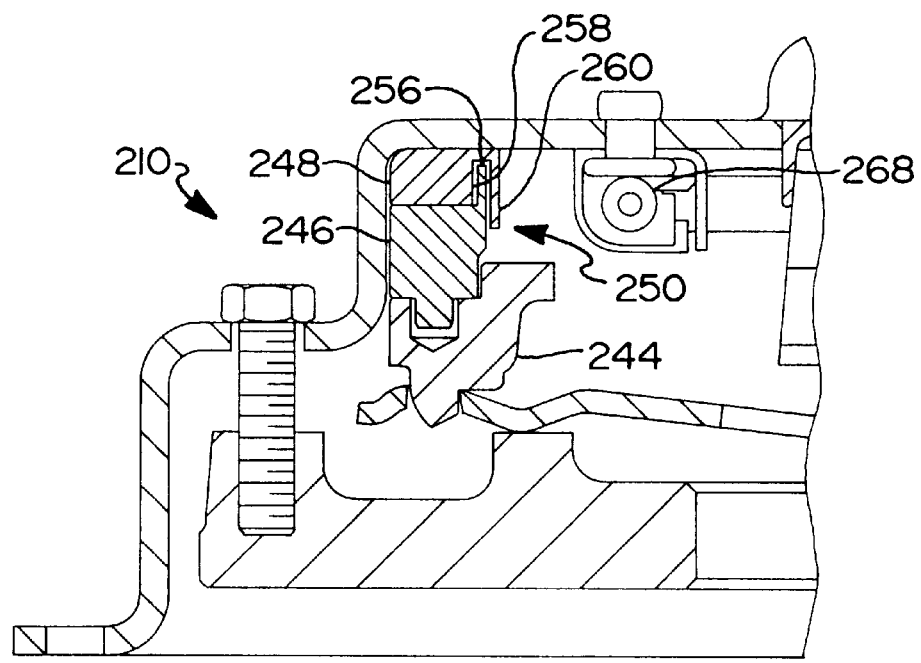
FIG. 3 is a partial sectional view of a third embodiment of the invention.
Figure 5:
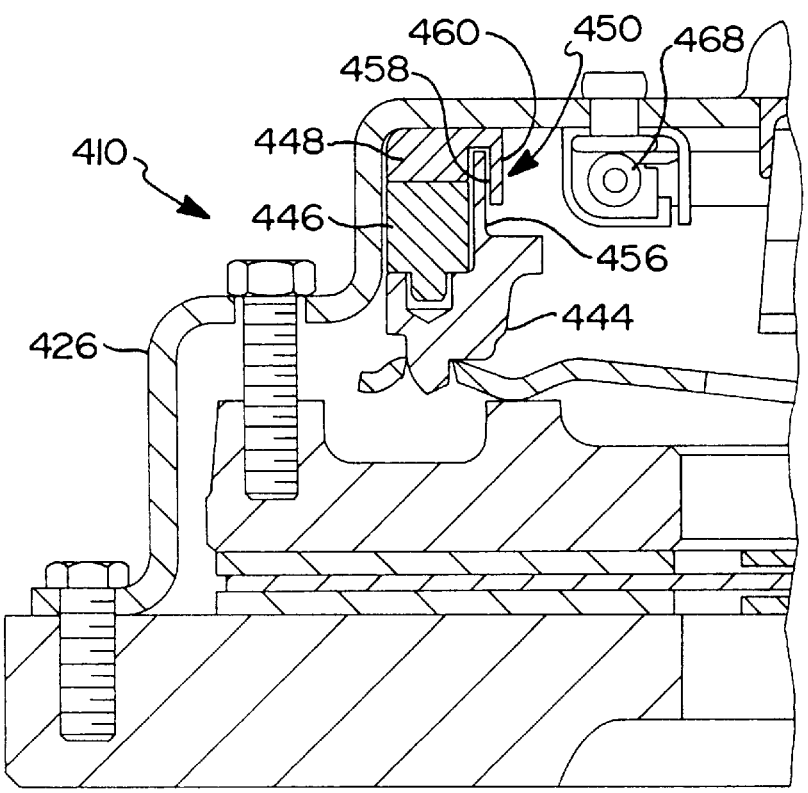
FIG. 5 is a partial sectional side view of a fifth embodiment of the invention.
Figure 8:
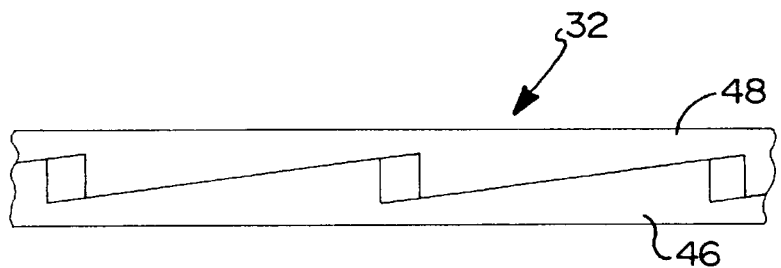
FIG. 8 is a schematic view of cams of the clutch of FIG. 1.

Adjustment mechanism 32 includes an adjusting ring 42 having engagement projections 44 retaining levers 30. Adjustment mechanism 32 also includes a first or stationary cam rotatably coupled to adjusting ring 44, and a second or rotating cam 48 axially disposed between first cam 46 and cover 26. Second cam 48 has a wear indicator tab which extends through a slot in cover 26. First cam 46 and second cam 48 have engaging inclined or cam surfaces which vary the distance of adjusting ring 42 from cover 26 with the amount of relative rotation between cams 46 and 48. Cams 46 and 48 are shown schematically in FIG. 8. A biasing spring, disposed between second cam 48 and any of the elements not rotating with respect to cover 26, biases second cam 48 to rotate in a direction increasing the distance of adjusting ring 42 from cover 26. Although no biasing spring is shown in FIG. 1, biasing springs 168, 268 and 468 are shown in the embodiments of FIGS. 2, 3 and 5. Adjustment for the wear of driven disc 16 occurs when clutch 10 is in a released condition.

While the apply springs 38 engage retainer 36, levers 30 are subject to a reactive load at adjusting ring 42 which is proportional to the load from springs 38. Therefore, adjusting mechanism 32 is operably disposed between cover 26 and springs 38.

A rigid adjustment mechanism shield 50 axially extends from cover 26 toward pressure plate 22, axially overlapping adjusting ring 42. Shield 50 is substantially annular in shape and is located radially within adjustment mechanism 32. Shield 50 is axially aligned with adjustment mechanism 32 to overlap and extend beyond the cam surfaces of first cam 46 and second cam 48. Shield 50, as shown in FIG. 1, is formed of sheet metal and has a radially extending flange welded to cast cover 26. However, it should be appreciated that shield 50 may be alternatively formed, such as by casting it as part of a unitary or one piece shield and cover. Shield 50 may, if necessary, have a gap or an opening therein to accommodate passage of an end of the biasing spring on a first side of shield 50 to the rotatable cam 48 on an opposite side of shield 50. It should also be appreciated that while shield 50 is shown concentric with axis 12, it may be located eccentrically thereto as necessary to dynamically balance clutch 10.

When clutch 10 is in operation, shield 50 prevents debris such as facing dust, cast iron dust, fretting material and external road dirt, moisture and salt from being centrifugally flung outward and into the cam or inclined surface interface from the center of the clutch. This debris, when it accumulates between the surface interface, has a deleterious effect on the performance of the adjustment mechanism. Shield 50 advantageously reduces the amount of debris reaching the interface. The axial length of shield 50 is selected to insure overlap of shield 50 over the cam surfaces.

A second embodiment of a shield for a clutch adjustment mechanism is shown in FIG. 2. Clutch 110 has a stamped cover 126 instead of the cast cover of the first embodiment. Clutch 110 is shown without a flywheel and without a driven disc. Pressure plate 122 is rotatably connected to cover 126 by a plurality of straps (not shown). The straps, like straps 28, prevent relative rotation between pressure plate 122 and cover 126 while allowing relative axial displacement of pressure plate 122 relative to cover 126. A flexible shield 150 extends between a radially inwardly projecting engagement shelf 152 of adjusting ring 144 to a rearmost inner surface of cover 126 to provide a protective seal in axial alignment with both first cam 146 and second cam 148. Flexible shield 150 has folds which enable accordion style deflection as adjusting ring 144 is moved further from cover 126 with increasing wear of the driven disc.

It should be appreciated that bolt 154 is typically removed from clutch 110 after installation of clutch 110 in a vehicle to enable pressure plate 122 to travel freely. Flexible shield 150 is formed of a suitable plastic which is both able to flex, and to sustain the anticipated temperature conditions of clutch 110.

A third embodiment of the invention, shown in FIG. 3, is substantially like that of the second embodiment shown in FIG. 2. However, in place of a unitary shield 50 or 150, shield 250 comprises a first baffle element 256 extending into a baffle slot 258. Baffle slot 258 is defined on one side by second cam 248 and on the opposite side by a second baffle element 260 extending toward adjusting ring 144. Shield 250 defined by baffle elements 256 and 260 greatly reduce the amount of debris which is able to reach the cam surfaces.

Figure 4:
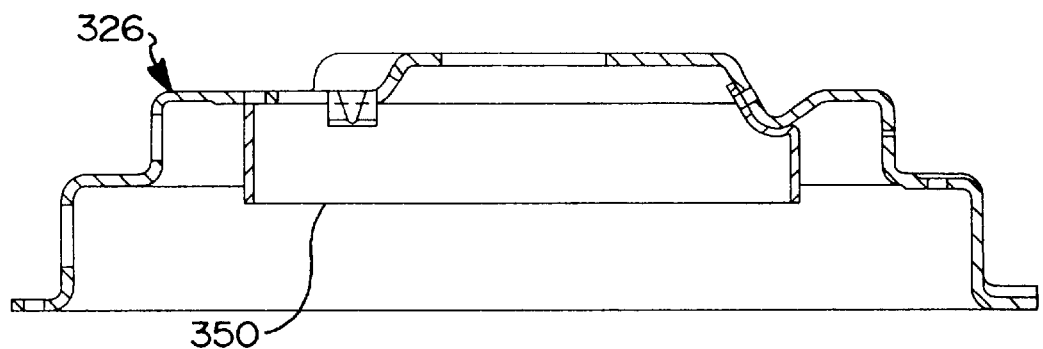
FIG. 4 is a sectional view of a stamped cover illustrating a fourth embodiment of the invention.

FIG. 4 shows a stamped cover 326. Cover 326 has a stamped one piece shield 350 fixed thereto. Shield 350 is substantially the same as shield 50, except that shield 350 is associated with a stamped cover 326 instead of a cast cover 26.

FIG. 5 illustrates a clutch 410 nearly identical to the clutch 210 of FIG. 3. However, shield 450 employs a first baffle element 456 extending from adjusting ring 444 instead of first cam 446. However, as in the clutch of FIG. 3, first baffle element 456 extends into a baffle slot 458 and second baffle element 460 extends from second cam 448 toward adjusting ring 444.

Figure 6:
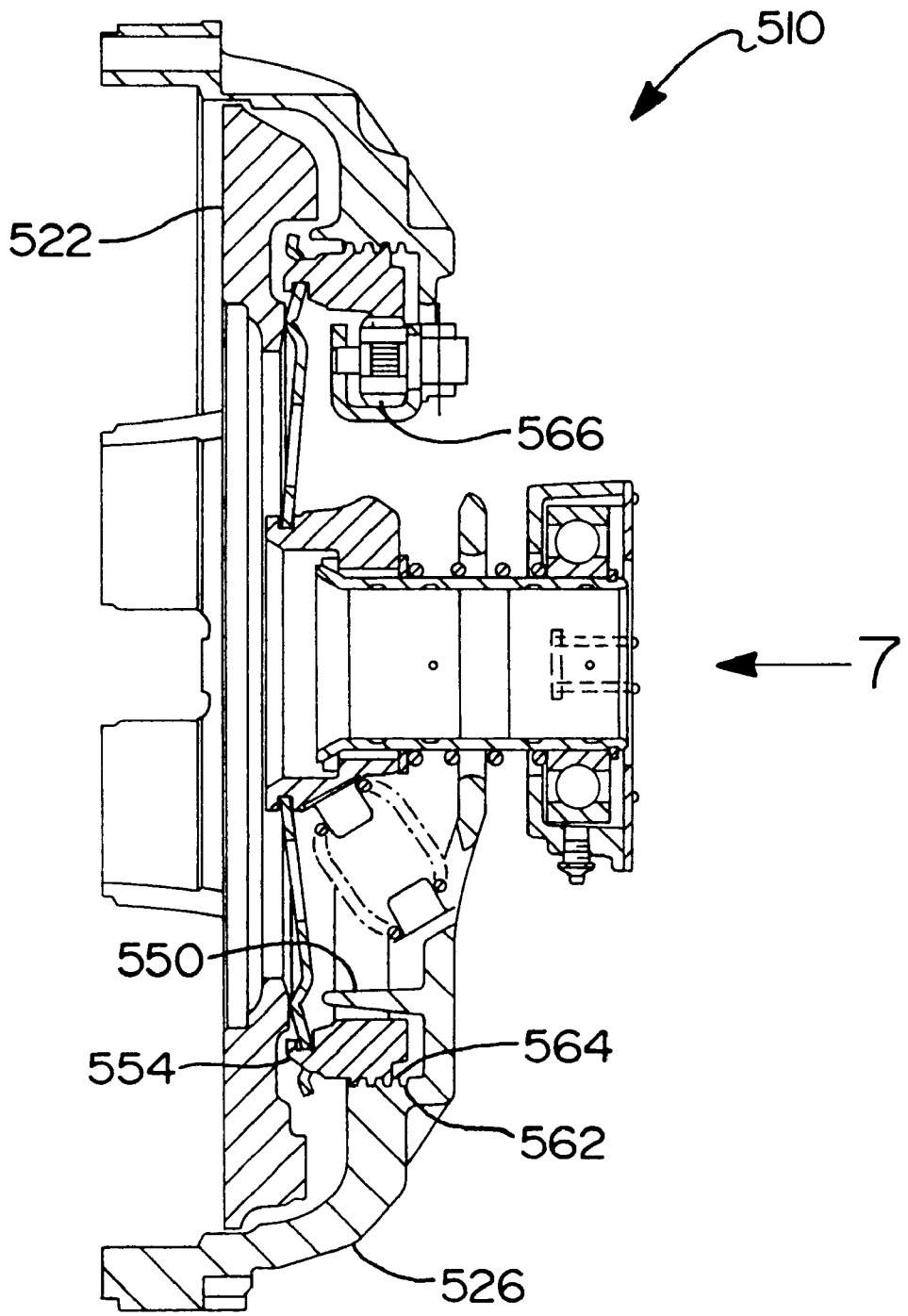
FIG. 6 is a sectional side view of a sixth embodiment of the invention.
Figure 7:
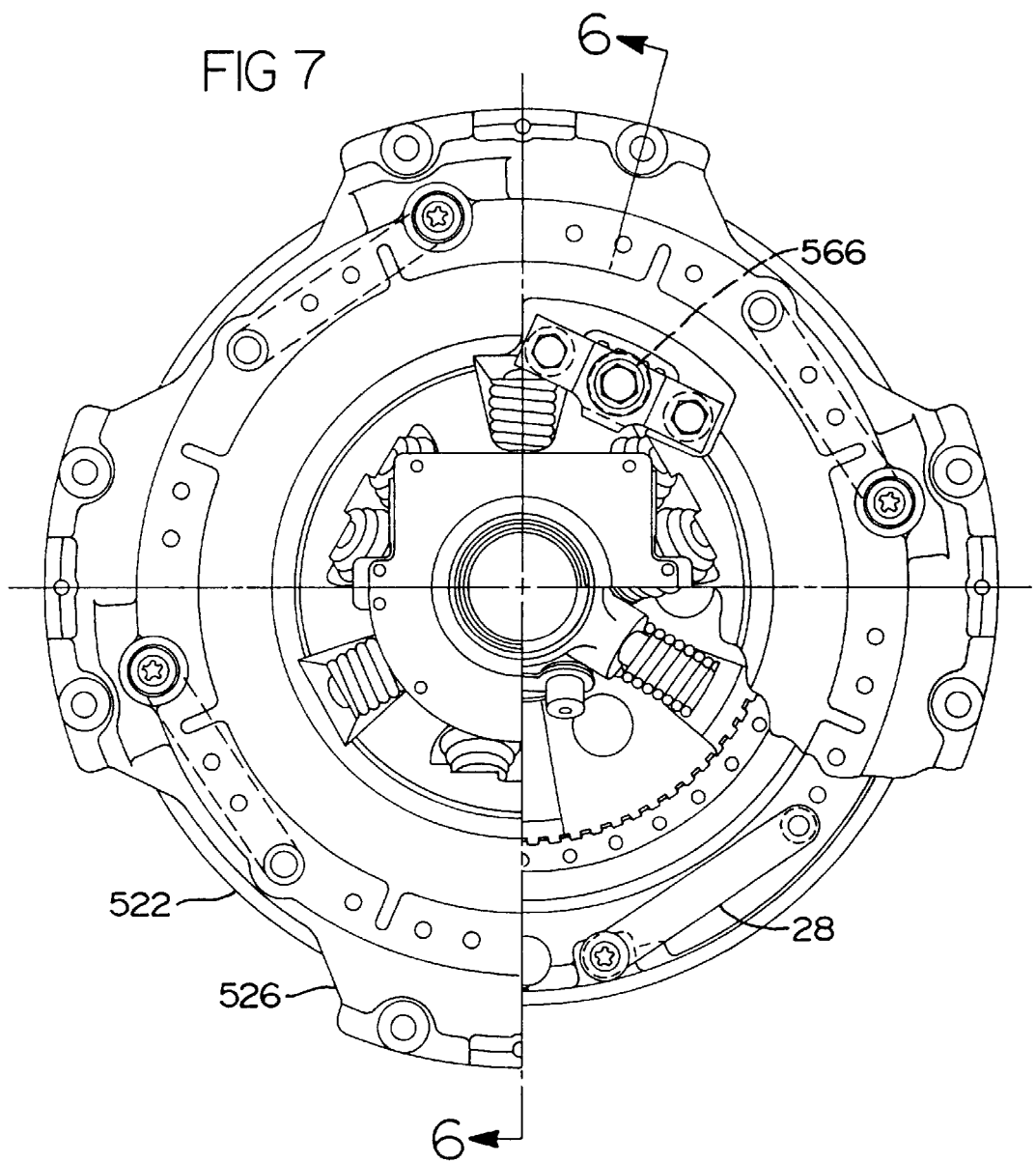
FIG. 7 is an end view of the clutch of FIG. 6 in the direction of arrow 7.

A clutch 510 having an alternative adjustment mechanism 532 is shown in FIGS. 6 and 7. Clutch 510 uses, in place of cams, outer diameter threads 562 on an outer diameter of adjusting ring 544 and inner diameter threads 564 in cover 526. Threads 562 and 564 each provide respective inclined surfaces which result in the axial displacement of adjusting ring 554 with relative rotation between those surfaces. In the embodiment shown in the FIGS. 6 and 7, adjustment does not occur automatically. Adjustment is made by rotating a pinion gear 566 which engages teeth on an inside diameter of adjusting ring 544 in a manner well known in the art. It should be appreciated that it is also known employ a spring loaded worm gear in place of pinion gear 566 for an automatic wear compensating system. Most commonly, the threads used in such adjustment mechanisms are of a fine thread. The coarse or acme style thread shown in the figures has been found to be much less sensitive to the intrusion of debris than fine threads. With fine threads, the debris tends to induce corrosion and binding of the threads, rendering the adjustment mechanism ineffective. It has been found that the increase in the helix angle of the thread, associated with the switch to coarse threads, reduces any tendency of the threads to bind. It has been further found that torsional activity created by the engine, combined with the relatively coarse thread and the associated large helix angle, keeps the adjusting ring operating in a free condition for a longer period of time than an adjustment mechanism employing a fine thread. The benefits of coarse threads can be further enhanced by shielding the threaded area from debris with a shield 550 which axially extends from cover 526 toward pressure plate 522 at least as far as the threaded interface.

It should be appreciated that there are readily apparent alternative embodiments to the above-described clutch configurations. For example, a diaphragm spring may be used in place of the coil springs. Yet alternatively, a diaphragm spring with integral levers or fingers could be employed in place of the separate springs and levers. Additionally, the adjustment mechanism and the associated shield could be alternatively disposed between the levers and the pressure plate instead of between the levers and the cover. Also, the locations of the rotating cam and the stationary cam could be transposed.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. A friction clutch for a motor vehicle comprising:
   a cover having an axis of rotation;
   a pressure plate coupled to the cover for rotation therewith about the axis and having a frictional engagement surface substantially normal to the axis;
   a biasing member acting on a lever interposed between the cover and the pressure plate and biasing the pressure plate toward an engaged pressure plate position;
   an adjustment mechanism centered about the axis and located at a first radial distance from the axis operably disposed between the lever and one of the pressure plate and the cover; and
   a substantially annular shield disposed radially within and axially overlapping the adjustment mechanism immediately adjacent the adjustment mechanism, wherein the shield is sized and oriented to protect the adjustment mechanism from debris radiating outward from a center area of the clutch.

2. A frictional clutch as claimed in claim 1, wherein the shield is flexible and is formed of plastic and is formed separate from the cover.

3. A frictional clutch as claimed in claim 2, wherein the shield abuts the cover on a first end and engages the adjusting mechanism on a second end, sealingly enclosing incline surfaces of the adjustment mechanism.

4. A frictional clutch as claimed in claim 1, wherein the shield is comprised of overlapping baffle elements.

5. A frictional clutch as claimed in claim 1, wherein the shield is rigid and axially extends from the cover toward the pressure plate.

6. A frictional clutch as claimed in claim 1, wherein the adjustment mechanism comprises mating threads on the cover and a portion of the adjustment mechanism.

7. A frictional clutch as claimed in claim 1, wherein the adjustment mechanism comprises mating acme threads on the cover and a portion of the adjustment mechanism.

8. A frictional clutch for a motor vehicle comprising:
   a cover having an axis of rotation;
   pressure plate coupled to the cover for rotation therewith about the axis and having a frictional engagement surface substantially normal to the axis;
   an adjustment ring adjustably mounted to the cover and defining a plurality of pivot points and centered about the axis;
   an adjustment mechanism axially disposed between the adjusting ring and the cover and having first and second inclined surfaces engaging each other wherein relative rotation between the first and second inclined surfaces axially displaced the adjusting ring pivot points away from the cover and the adjustment mechanism being located at a first radial distance about the axis;
   a plurality of levers radially oriented about the axis and engaging the adjusting ring proximate to a radially outer end of the levers and engaging the pressure plate radially inwardly of the radially outer end;
   a retainer engaged by the radially inner tips of the levers and selectively axially moveable between engaged and disengaged positions;
   a plurality of springs disposed between the cover and the retainer wherein the springs bias the lever toward the pressure plate and the springs act on the levers to bias the pressure plate to an engaged position; and
   a substantially annular shield disposed radially within the adjustment mechanism and in axial alignment therewith immediately adjacent the adjustment mechanism, wherein the shield protects the adjustment mechanism by blocking debris radiating outward from a center area of the clutch.

9. A friction clutch as claimed in claim 8, wherein the shield is flexible and is formed of plastic.

10. A frictional clutch as claimed in claim 9, wherein the shield abuts the cover and extends axially from the cover and sealingly engages the adjusting ring and sealingly encloses the inclined surfaces of the adjustment mechanism.

11. A frictional clutch as claimed in claim 8, wherein the shield comprises overlapping baffle elements.

12. A frictional clutch as claimed in claim 8, wherein the shield is rigid and axially extends from the cover toward the pressure plate.

13. A frictional clutch as claimed in claim 8, wherein the adjustment mechanism comprises outer threads on the adjusting ring and mating inner acme threads in the cover.

14. A frictional clutch as claimed in claim 8, wherein the adjustment mechanism comprises outer acme threads on the adjusting ring and mating inner acme threads in the cover.

15. A frictional clutch for a motor vehicle comprising:

a cover having an axis of rotation;

a pressure plate coupled to the cover for rotation therewith about the axis and having a frictional engagement surface substantially normal to the axis;

means for biasing the pressure plate away from the cover disposed between the pressure plate and the cover;

means for adjusting a load applied to the pressure plate by the biasing means, the adjusting means being disposed between the biasing means and one of the pressure plate and the cover; and a substantially annular shield disposed within the cover and radially within the adjusting means in axially alignment therewith, wherein the shield is sized and oriented to protect the adjusting means from debris radiating outward from a center area of the clutch.

* * * * *

UNITED STATES PATENT AND TRADEMARK OFFICE
CERTIFICATE OF CORRECTION

PATENT NO.    : 6,098,773
DATED         : August 8, 2000
INVENTOR(S)   : Blessinger et al It is certified that error appears in the above-identified patent and that said Letters Patent is hereby corrected as shown below:

Column 6,
Line 31, delete "displaced" and insert -- displaces --

Column 8,
Line 1, insert -- a portion of -- after "between" and insert -- acting against the pressure plate -- after "means"
Line 6, insert -- immediately adjacent the adjustment mechanism -- after "therewith" and before the ","

Signed and Sealed this

Eleventh Day of September, 2001

*Attest:*

*Attesting Officer*

NICHOLAS P. GODICI
*Acting Director of the United States Patent and Trademark Office*